March 24, 1936. A. KOWALSKY 2,034,911
CORN BINDER
Filed July 31, 1935 2 Sheets-Sheet 1

Inventor
Andrew Kowalsky
By V. F. Laddague
Atty.

March 24, 1936.  A. KOWALSKY  2,034,911
CORN BINDER
Filed July 31, 1935   2 Sheets-Sheet 2

Inventor
Andrew Kowalsky
By V. F. Larragne
Atty.

Patented Mar. 24, 1936

2,034,911

UNITED STATES PATENT OFFICE 2,034,911

CORN BINDER

Andrew Kowalsky, Oak Park, Ill., assignor to International Harvester Company, a corporation of New Jersey Application July 31, 1935, Serial No. 33,945

9 Claims. (Cl. 56—67)

The invention relates to corn harvesters.

When these machines are used for harvesting short crops, such as short corn or soy beans, it is found that the harvester does not effectively handle said crops because the knife, butt pan and gathering chains are not properly located as they are positioned for the handling of tall corn.

To make the harvester usable for the short crops mentioned it is desirable to move the knife forwardly on the frame and to raise the butt pan so that the gathering chains, binding attachment and bundle discharge means can properly be presented to the crop. As it is too much of a job to remove the regular low butt pan, it is desirable in meeting the short crop conditions to provide short corn attachments, such as a modified knife drive and special butt pan, which can easily and quickly be placed on the binder to adapt the machine for handling these short crops.

Accordingly, the main object of the invention is to provide an improved butt pan attachment for corn binders of the vertical type to enable the binder to harvest short corn and soy beans.

Another object is to provide such a butt pan which can be temporarily mounted adjustably on and above the regular butt pan of the harvester with a minimum of effort, so that the machine may be quickly converted for handling the short crops.

It is also an object to provide means for relocating the knife in a forward position on the gathering frame so that the instant the short crop is cut it will be effectively engaged by the gathering chains and be moved in an erect position on to the auxiliary short crop butt pan attachment.

Still another object is to provide a simple drive extension means for driving the knife in its relocated forward position.

Other important objects will become apparent to those skilled in this art as the disclosure is more fully made.

The vertical corn binder which has become standard in the art, and with which the present improvements are operatively associated, embodies a wheel carried frame including gathering boards forming a passage to receive the standing row crop. A knife is located on the frame in a forward position to sever the stalks, whereupon gathering chains engage the cut stalks and move them rearwardly in an erect position on to and across a special, elevated butt pan. The stalks are then accumulated in a bunch at the rear end of the butt pan where they are bound and discharged as bundles from the machine. Briefly, the novel structure in this combination relates to the supplementary butt pan and its mounting, and the special knife location and the attachment extension means for driving the knife in such changed location.

In the accompanying sheets of drawings illustrating a practicable embodiment of the invention:

Figure 1:
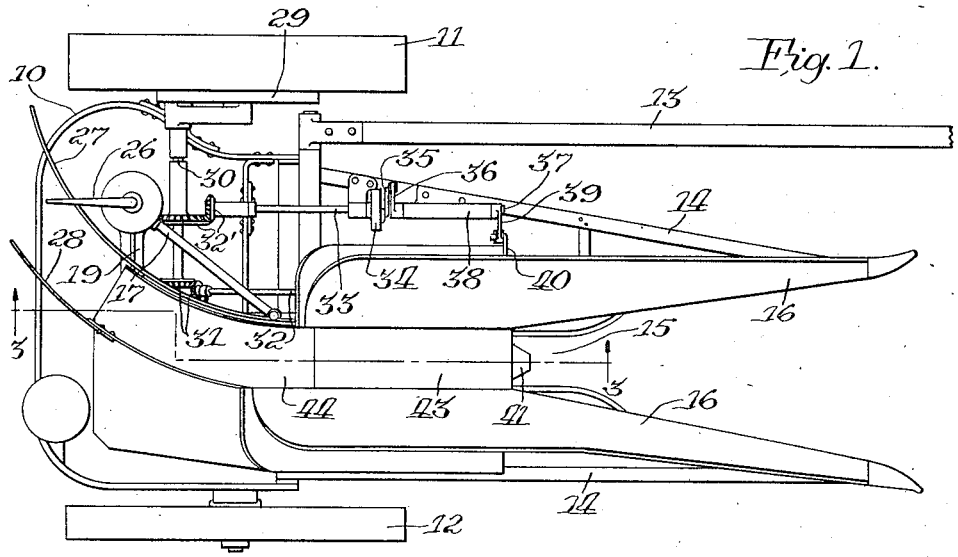
Figure 1 is a general plan view of a vertical corn binder embodying the short crop handling attachments.
Figure 2:
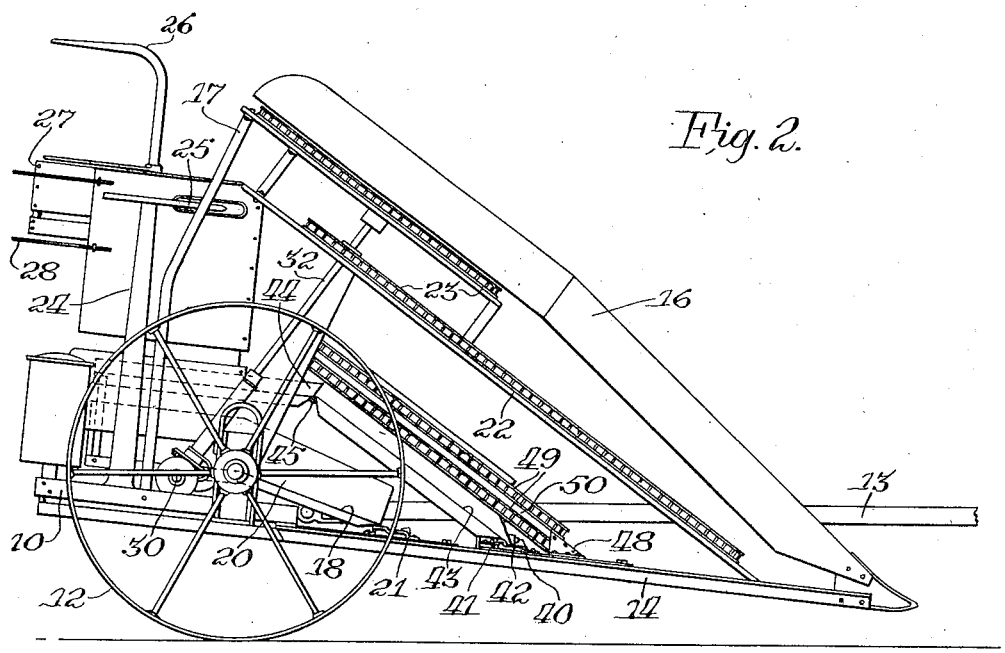
Figure 2 is a general side elevational view of the modified corn binder.

The corn binder embodies the usual main frame 10 carried from stub axles that mount a main ground drive, or bull wheel 11, and a second support wheel 12. Connected to the frame is the usual forwardly extending draw element 13. There is also provided the forwardly extending auxiliary frame 14 which is divided to form a throat or passage 15 to receive the row crop as the machine moves through the field. The opposite sides of this auxiliary frame carry the usual upwardly and rearwardly inclined gathering board 16, the rear ends of which are suitably braced to the main frame by standards 17.

Figure 3:
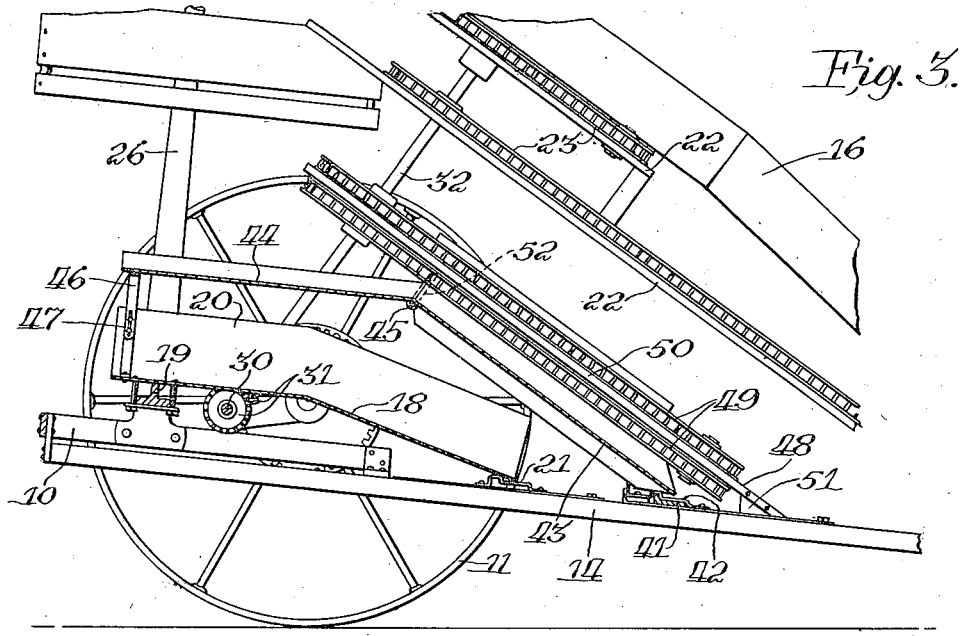
Figure 3 is a longitudinal side sectional view through the corn binder taken along the line 3—3 of Figure 1, looking in the direction of the arrows; and, Figure 4 is a general rear end elevational view of the corn binder.
Figure 4:
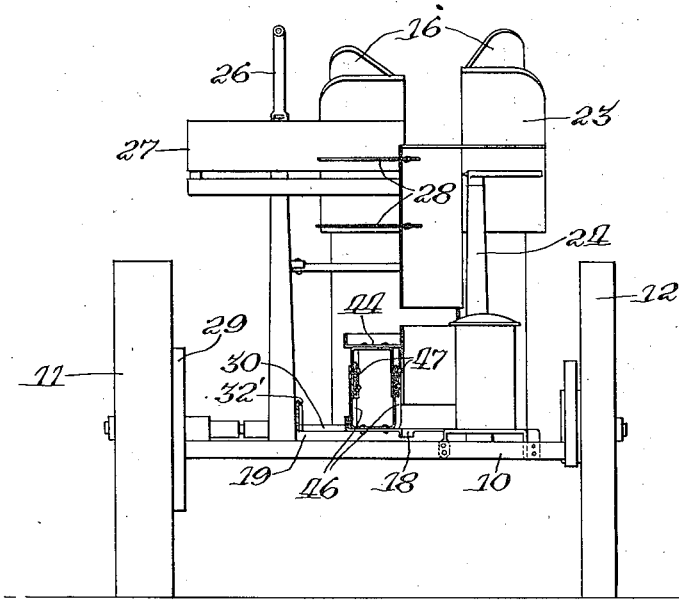

The usual butt pan 18 is carried at its front end by the frame 14 in line with and rearwardly of the throat 15, while the rear end of said pan is supported on a bracket 19, as shown in Figure 3. This butt pan has sides 20 to form a channel guide for the butts of the stalks to help hold them erect, the rear end of said butt pan channel being open to permit of discharge of the tied bundles. A knife guide clip 21 is carried on the frame 14 at the front end of the pan 18 for mounting the usual reciprocatory knife that severs the stalks as they enter the passage 15. The gathering boards 16 include a number of spaced supplementary plates 22 for mounting feed chains 23 that grasp the corn stalks to move them positively in erect position to be cut and further to move them across the butt pan 18 to a binding mechanism generally shown at 24, which includes the needle 25. When the bundles has been tied, it is discharged from the rear end of the butt pan 18 by a discharge mechanism 26, the discharging bundles being guided by a shield 27 and fingers 28 in the conventional manner.

The operative parts are driven in the usual way from gearing 29 operated by the bull wheel 11, which in turn drives a countershaft 30. From this shaft power is distributed through gears 31 to drive a shaft 32 for operating the endless chains 23. By means of bevel gears 32' a longitudinal shaft 33 journaled on the frame 14 is driven. The forward end of this shaft, as shown in Figure 1, carries a flywheel 34 to operate a crank 35. Connected to the crank is an arm 36 for operating a shaft 37 journaled in a bearing 38, the front end of said shaft carrying an arm 39 to operate a pitman link 40. The link 40 is connected to reciprocate the knife shown at 41 associated with a forward guide clip 42. When the knife is in the guide clip 21, which is its usual position for full length corn cutting, the pitman link 40 is connected to the crank 35 to be operated directly thereby. The remaining parts 36 to 39, inclusive, are attachment parts for driving the knife when it is located in a forward position as will be presently described.

When short corn or soy beans are to be cut, the butt pan 18 is not effective to hold the stalks at the right elevation to enable the needle 25 to tie the forming bundles at substantially their middles, which, of course, is the desirable place to tie the bundles. While some butt pans, such as the one illustrated at 18, are adjustable, the range of adjustment is not ample effectively to take care of the short crops mentioned. Accordingly, it is desirable to provide an auxiliary butt pan 43 above the main pan 18 and with its front end connected to the frame 14 adjacent the front knife clip 42. Said pan slopes upwardly and rearwardly to carry the stalk butts to a relatively high level and thence on to a rear hinged, substantially horizontally disposed butt pan extension 44, the same being hinged at 45, as shown. The rear end of the extension is supported on legs 46 connected adjustably at 47 to the main pan sides 20.

Adjacent the sides of the pan 43 the gathering mechanism includes side plates 48 carrying conveyer chains 49 for moving the short stalks positively over the pan, there being further a flat presser spring 50 connected to a bracket 51 to press the stalks toward the said chains so that the latter will aggressively engage the stalk and insure their movement in erect position on to the butt pan part 44 to be bound and discharged in bundle form. Obviously, such short crop material will be presented by the pan 44 to the binding needle 25 at a level permitting the band to be tied at the middle of the formed bundle. The front end of the pan 43 is suitably mounted in a detachable manner to the frame 14 while the hinge point 45 is also preferably hung in a detachable manner from any suitable part of the machine, such for example as by means of a bolt 52.

From this disclosure it is now clear that, when it is desired to harvest short crops the corn binder can be quickly and easily converted effectively to handle such crops, by slimply mounting the supplementary butt pan 43, 44 above the main, or regular pan 18. Next the pitman 40 is disconnected from the crank 35 and the knife 41 is moved ahead from the clip 21 to the clip 42, where it will be operatively associated with the front end of the short crop or auxiliary butt pan 43, 44. The drive shaft extension parts 36, 37 are next mounted in place, the pitman 40 now being connected between the crank 39 and the knife 41 to operate the latter in its changed position.

As the machine now moves along a row of short corn or soy beans, the knife 41 severs the stalks and the chains 49 serve to hold them erect and slide their butts on to the pan 43 up which they move to the butt pan extension part 44, where they accumulate in the usual manner and are tied in a bundle which is discharged in a well known manner. The pan part 44 is supported at such a level above the regular pan 18 as to enable the needle 25 to tie the bundles at their middles. Thus, short crops can be effectively handled with the regular binder, the improved attachments of the present invention clearly making this possible.

It can now be seen that the usefulness of corn binders has been materially extended and the attachments of this invention achieve all of the desirable objects heretofore recited.

It is the intention to cover all changes and modifications which do not depart from the spirit and scope of the invention as indicated by the following claims.

What is claimed is:

1. The combination with a corn binder having a longitudinal frame and crop gathering means including a knife guide and knife mounted in a rearward position on the frame and a butt pan extending upwardly and rearwardly therefrom, of an attachment for the binder to enable it to handle short crops comprising an auxiliary butt pan carried on the frame and the aforementioned butt pan, said auxiliary butt pan extending upwardly and rearwardly a substantial distance above the first pan, a knife guide on the frame positioned forwardly of the aforementioned knife guide at the forward end of the auxiliary butt pan, said knife adapted to be operably mountable in either guide, means for driving the knife in either position, and gathering chains included in the gathering means to grasp severed stalks and move them in erect position on to the auxiliary butt pan.

2. The combination with a corn binder having a longitudinal frame and crop gathering means including a knife guide and knife mounted in a rearward position on the frame and a butt pan extending upwardly and rearwardly therefrom, of an attachment for the binder to enable it to handle short crops comprising an auxiliary butt pan carried on the frame and including a part adjustably mounted on the aforementioned butt pan, said auxiliary butt pan extending upwardly and rearwardly a substantial distance above the first pan, a knife guide on the frame positioned forwardly of the aforementioned knife guide at the forward end of the auxiliary butt pan, said knife adapted to be operably mountable in either guide, means for driving the knife in either position, and gathering chains included in the gathering means to grasp severed stalks and move them in erect position on to the auxiliary butt pan and the adjustably mounted part thereof.

3. The combination with a corn binder having a longitudinal frame and crop gathering means including a knife guide and knife mounted in a rearward position on the frame and a butt pan extending upwardly and rearwardly therefrom, of an attachment for the binder to enable it to handle short crops comprising an auxiliary butt pan carried on the frame and the aforementioned butt pan, said auxiliary butt pan extending upwardly and rearwardly a substantial distance above the first pan and including a hinged portion arranged substantially horizontally, means on the aforementioned butt pan for adjusting the level of the hinged portion, a knife guide on the frame positioned forwardly of the aforementioned knife guide at the forward end of the auxiliary butt pan, said knife adapted to be operably mountable in either guide, means for driving the knife in either position, and gathering chains included in the gathering means and running substantially parallel with the auxiliary butt pan to grasp severed stalks and move them in erect position on to the auxiliary butt pan and the adjustable portion thereof.

4. The combination with a corn binder having a longitudinal frame and crop gathering means on the frame and a butt pan extending upwardly and rearwardly on the frame, of an attachment for the binder to enable it to handle short crops comprising an auxiliary butt pan carried on the frame above the aforementioned butt pan, said auxiliary butt pan extending upwardly and rearwardly a substantial distance above the first pan from a point on the frame substantially forwardly of the first butt pan, the rear end of the auxiliary butt pan being mounted on the first butt pan, and gathering chains included in the gathering means to grasp severed stalks and move them in erect position on to the auxiliary butt pan.

5. The combination with a corn binder having a longitudinal frame and crop gathering means mounted on the frame and a butt pan extending upwardly and rearwardly on the frame, of an attachment for the binder to enable it to handle short crops comprising an auxiliary butt pan carried on the frame above the aforementioned butt pan, said auxiliary butt pan extending upwardly and rearwardly a substantial distance above the first pan from a point on the frame substantially forwardly of the first butt pan, the rear end of the auxiliary butt pan comprising a hinged horizontal extension adjustably mounted on the first butt pan, and gathering chains included in the gathering means to grasp severed stalks and move them in erect position on to the auxiliary butt pan and the hinged extension thereof.

6. The combination with a corn binder having a longitudinal frame and crop gathering means mounted on the frame and a butt pan inclined upwardly and rearwardly on the frame, of an attachment for the binder to enable it to handle short crops comprising an auxiliary butt pan carried on the frame and the aforementioned butt pan, said auxiliary butt pan embodying a fixed inclined portion extending upwardly and rearwardly, said auxiliary pan also including a substantially horizontal portion hingedly connected to the fixed portion above the first pan, means for adjustably supporting the hinged portion from the first butt pan, and gathering chains included in the gathering means and running parallel with the fixed inclined portion of the auxiliary pan to grasp severed stalks and move them in erect position on to the said auxiliary butt pan.

7. A corn binder having a longitudinal frame carried at its rear end on a pair of wheels and transverse stub axles, upwardly and rearwardly inclined gathering frames carried on the longitudinal frame, a knife positioned on the frame at a point a substantial distance forwardly of the wheels, gathering chains on the gathering frames running upwardly and rearwardly from a point forwardly of said knife, a butt pan across which severed stalks are dragged by the chains in erect position, said butt pan extending upwardly and rearwardly from a point immediately behind the knife and substantially parallel with the chains and including a substantially horizontal rearward extension carried at a level substantially midway between the axis of the stub axles and the top of said wheels.

8. A corn binder having a longitudinal frame carried at its rear end on a pair of wheels and transverse stub axles, upwardly and rearwardly inclined gathering frames carried on the longitudinal frame, a knife positioned on the frame at a point a substantial distance forwardly of the wheels, gathering chains on the gathering frames running upwardly and rearwardly from a point forwardly of said knife, a butt pan across which severed stalks are dragged by the chains in erect position, said butt pan extending upwardly and rearwardly from a point immediately behind the knife and substantially parallel with the chains and including a substantially horizontal rearward extension carried at a level substantially midway between the axis of the stub axles and the top of said wheels, said extension being hingedly mounted and including adjustable supports for changing the level thereof.

9. A corn binder having a longitudinal frame carried at its rear end on a pair of wheels and transverse stub axles, upwardly and rearwardly inclined gathering frames carried on the longitudinal frame, a knife positioned on the frame at a point a substantial distance forwardly of the wheels, gathering chains on the gathering frames running upwardly and rearwardly from a point forwardly and of said knife, a butt pan across which severed stalks are dragged by the chains in erect position, said butt pan embodying a fixed inclined portion extending upwardly and rearwardly from a point immediately behind the knife and substantially parallel with the chains, said pan including a substantially horizontal rearward extension hingedly connected thereto and carried at a level substantially midway between the axis of the stub axles and the top of said wheels, and adjustable supports for carrying and varying the level of said hinged extension.

ANDREW KOWALSKY.